Figure 1:
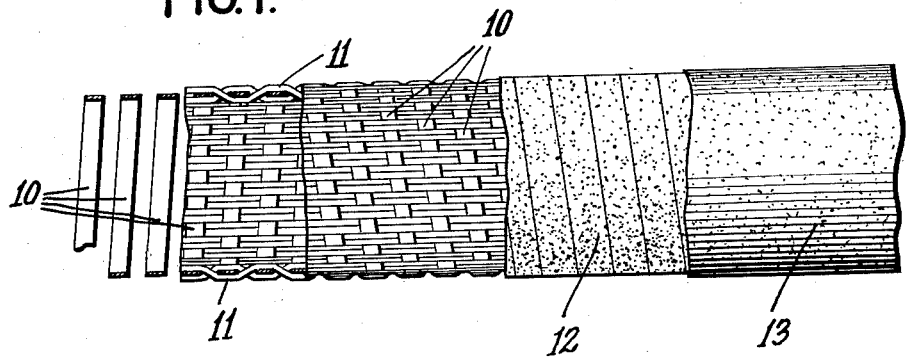

Sept. 9, 1930.   G. L. WANAMAKER   1,775,334

FLEXIBLE TUBING

Filed Jan. 15, 1929

Inventor
George L. Wanamaker
By his Attorneys
Cooper, Kerr & Dunham

Patented Sept. 9, 1930

1,775,334

UNITED STATES PATENT OFFICE

GEORGE L. WANAMAKER, OF AMBRIDGE, PENNSYLVANIA, ASSIGNOR TO NATIONAL ELECTRIC PRODUCTS CORPORATION, OF NEW YORK, N. Y., A CORPORATION OF DELAWARE

FLEXIBLE TUBING

Application filed January 15, 1929. Serial No. 332,631.

This invention relates to improvements in flexible conduits and more particularly relates to a flexible conduit which is adapted for uses where a considerable degree of mechanical strength is required so that it may bend on a sharp radius without collapsing.

A further desideratum is that the conduit affords considerable resistance to abrasion and when in use, for example in automobiles where there is considerable vibration, the conduit is noiseless. Such conduit, furthermore, frequently contains grease, for example when the conduit is used as a covering for a speedometer cable, and provision should be made for insuring against the escape of the grease from the interior of the cable and in particular preventing the grease or interior lubricant from permeating through the conduit walls to such an extent that the conduit is unsightly upon the exterior thereof.

The present invention is directed to the provision of an improved conduit formed in a particular way from certain composite materials to the general end that the foregoing and other qualities may be secured as will hereinafter be more fully set forth in the accompanying specification and claims and shown in the drawings.

The drawings by way of illustration show a prefered embodiment of the invention.

Figure 1 is a view of my improved flexible conduit material drawn to show the interior construction and materials which are employed;

Figs. 2 to 5 inclusive show various forms of metal filler.

Figure 2:
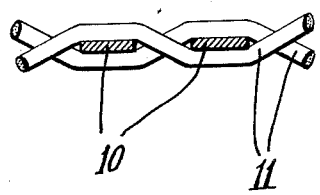
Figure 3:
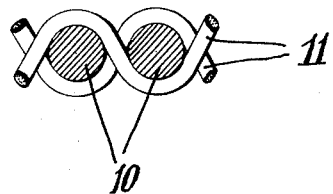
Figure 4:
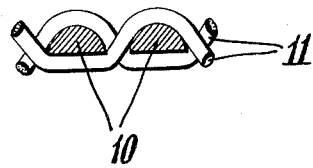
Figure 5:
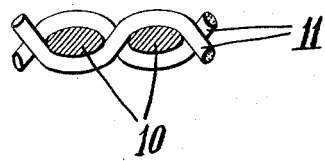

In more detail 10 represents a metallic filler wound with spiral convolutions as shown. Woven in and out between this filler are warp strands 11 of fibrous material such as cotton or wool. These strands serve to hold the convolutions of the metal filler 10 together and also serve as a base for the impregnating and covering materials. Impregnated through the warp strands is asphaltic saturating and impregnating material shown at 12. This asphaltic material serves not only to protect the fibrous material against moisture, but also aids in retaining oil and grease within the cable or conduit. Over the asphaltic material there is placed a finished coating or layer of lacquer shown at 13. Such lacquer preferably comprises a composition made from a cellulose derivative as a base with a solvent, a coloring material and diluent in excess of the solvent. Such lacquer specifically may be of the composition described in Letters Patent to Young, No. 1,410,790. The use of such lacquer exteriorly of the asphaltic impregnated flexible conduit not only affords a very pleasing finish, but it also cooperates with the asphaltic material to completely seal the conduit and entirely prevent any escape or permeation of grease or oil from the interior of the conduit to the exterior thereof. The lacquer furthermore is of such character that it does not have a solvent action upon asphaltic or like materials. The metal filler not only serves its mechanical function of affording strength while permitting flexibility to the conduit when it is in service, but such filler also serves to prevent any shrinkage of the conduit when it is being impregnated with the asphaltic materials. The particular configuration of the filler is immaterial. If desired, it may be flat as shown in Figs. 1 and 2 or it may be round as shown in Fig. 3, half round or D-shaped as shown in Fig. 4, or elliptical as shown in Fig. 5.

The ultimate conduit is sturdy and strong and is entirely grease proof after extended use. Furthermore, its character is such that when in use with a speedometer cable the latter is quite noiseless in operation.

What I claim is:

1. A flexible conduit comprised of filler strands which are wholly metallic, having woven in and out thereof warp strands of fibrous material and having the said warp strands impregnated with asphaltic material and prevented from shrinking during and subsequent to impregnation with the asphaltic material by the metallic strands and said impregnated warp strands being covered at the exterior with a lacquer which is insoluble with respect to the asphaltic material and impervious to grease or the like.

2. A flexible conduit comprising a body portion which consists of adjacent convolutions of metallic filler with warp strands of fibrous material which are woven in and out between the convolutions of the metallic filler, asphaltic material impregnating the warp strands, said filler affording strength and preventing shrinkage of the warp strands when the asphaltic material is impregnated therein and a finish coat of lacquer of a composition made from a cellulose derivative as a base, which material is impermeable by grease and insoluble in the asphaltic material, said lacquer coating being disposed over the asphalt impregnated body portion and providing additional moisture proof and grease resisting characteristics to the conduit.

In testimony whereof I hereto affix my signature.

GEORGE L. WANAMAKER.